United States Patent [19]

Richard, Jr.

[11] 4,389,057

[45] Jun. 21, 1983

[54] WHEELCHAIR COVER

[76] Inventor: Spence Richard, Jr., Rte. 1, Box 295, Lamar, Miss. 38642

[21] Appl. No.: 270,787

[22] Filed: Jun. 5, 1981

[51] Int. Cl.³ .............................................. B62J 23/00

[52] U.S. Cl. .............................. 280/289 WC; 135/90; 296/78 R; 297/DIG. 4

[58] Field of Search ............. 296/78 R; 280/289 WC, 280/289 S; 297/DIG. 4; 135/1 A, 3 A, 5 A, 7.1 A

[56] References Cited

U.S. PATENT DOCUMENTS

| | | | |
|---|---|---|---|
| 2,641,770 | 6/1953 | Chapin | 135/1 A |
| 3,333,888 | 8/1967 | Williams | 296/78 R |
| 3,709,553 | 1/1973 | Churchill | 296/78 R |
| 4,336,964 | 6/1982 | Pivar | 296/78 R |

*Primary Examiner*—David M. Mitchell
*Assistant Examiner*—John A. Carroll
*Attorney, Agent, or Firm*—Walker & McKenzie

[57] ABSTRACT

A transparent cover is attached to a wheelchair for protecting the user of the wheelchair from adverse weather conditions and the like. The cover includes a number of clear panels attached to a frame. The frame is removably attached to the wheelchair.

9 Claims, 4 Drawing Figures

WHEELCHAIR COVER

BACKGROUND OF THE INVENTION

1. Field of the Invention

The present invention relates in general to means for protecting the user of a wheelchair from adverse weather conditions and the like.

2. Description of the Prior Art

Chapin, U.S. Pat. No. 2,641,770 discloses an enclosure device for being attached to a standard wheelchair to allow persons to take a shower bath while sitting in the wheelchair. Perron, U.S. Pat. No. 1,997,323 discloses an invalid chair having wheels thereon and having a movable canopy for protecting the person in the invalid chair from rain and the like. Ames, U.S. Pat. No. 2,621,707 discloses a wheeled support vehicle for individuals unable to walk, the vehicle being provided with a canopy and a weather shield. Various other patents have issued for raincovers or the like for use with a babystroller (see, Shimabukuro, U.S. Pat. No. 2,789,863; Merclean, U.S. Pat. No. 3,227,484; and Grell, U.S. Pat. No. 3,834,756); windshields for skylift chairs (see, Savage, U.S. Pat. No. 3,729,225); and covers for affording weather protection to tractors and golf carts (see, Weaklend, U.S. Pat. No. 2,631,057 and Mills, U.S. Pat. No. 4,098,536). None of the above patents disclose or suggest the present invention.

SUMMARY OF THE INVENTION

The present invention is directed towards providing a protector means for use with a wheelchair to protect the user of the wheelchair from adverse weather conditions and the like. The concept of the present invention is to attach a cover to a standard wheelchair to cover at least a portion of the user of the wheelchair thereby protecting the user from rains, winds and other adverse weather conditions and the like.

The protector means of the present invention comprises, in general, a cover means for covering at least a portion of the user of a wheelchair, and an attachment means for attaching the cover means to the wheelchair.

DESCRIPTION OF THE PREFERRED EMBODIMENT

Figure 1:
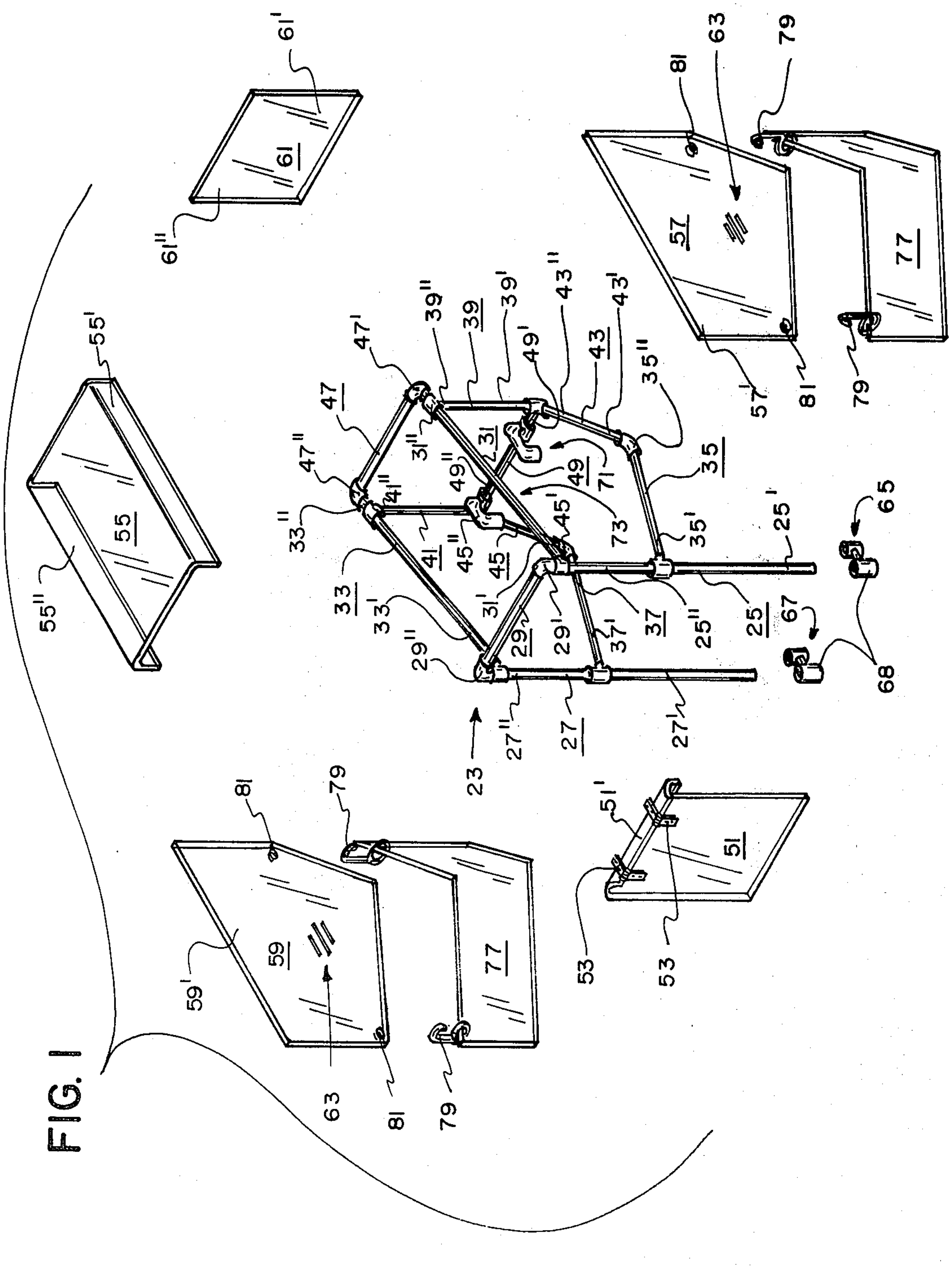
FIG. 1 is an exploded pictorial view of the protector means of the present invention.

The protector means 11 of the present invention is used in combination with any standard wheelchair 13 or the like for protecting the user of the wheelchair from, for example, adverse weather conditions and the like. The wheelchair 13 may be of typical construction having, for example, a tubular framework 15 defining a seat and supported by wheels 17 (see FIG. 2). The protector means 11 includes, in general, a cover means 19 for covering at least a portion of the user of the wheelchair 13; and attachment means 21 for attaching the cover means 19 to the wheelchair 13 (see, in general, FIG. 1).

Figure 2:
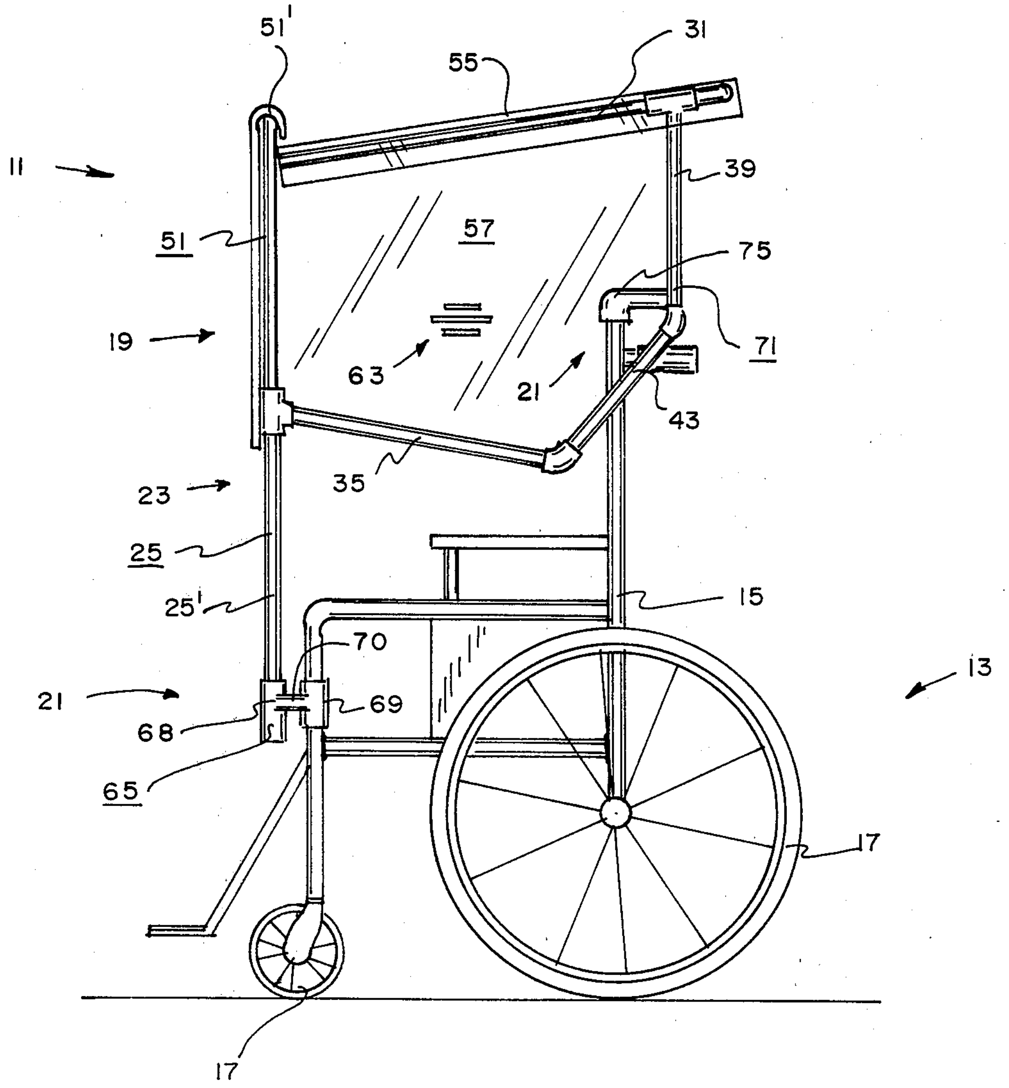
FIG. 2 is a side elevational view of the protector means of the present invention shown attached to a standard wheelchair.

The protector means 11 also preferably includes a frame means 23 for supporting the cover means 19 on the wheelchair 13 (see FIGS. 1 and 2). The frame means 23 preferably includes a first substantially vertically front post member 25 having a lower end 25' and an upper end 25" and a second substantially vertical front post member 27 having a lower end 27' and an upper end 27". The frame means 23 also preferably includes a substantially horizontal front cross bar member 29 having a first end 29' and a second end 29". The first end 29' of the front cross bar member 29 is preferably attached to the upper end 25" of the first front post member 25. The second end 29" of the front cross bar member 29 is preferably attached to the upper end 27" of the second front post member 27. The frame means 23 also preferably includes a first substantially horizontal side bar member 31 having a first end 31' and a second end 31". The frame means 23 also preferably includes a second substantially horizontal side bar member 33 having a first end 33' and a second end 33". The first end 31' of the first side bar member 31 is attached to the upper end 25" of the first front post member 25. The first end 33' of the second side bar member 33 is attached to the upper end 27" of the second front post member 27. The frame means 23 also preferably includes a third substantially horizontal side bar member 35 having a first end 35' and a second end 35" and preferably includes a fourth substantially horizontal side bar member 37 having a first end 37' and a second end 37". The first end 35' of the third side bar member 35 is preferably attached to the first front post member 35 at a location between the lower and upper ends 25', 25" thereof. The first end 37' of the fourth side bar member 37 is preferably attached to the second front post member 27 at a location between the lower and upper ends 27', 27" thereof. The frame means 23 also preferably includes a first substantially vertical rear post member 39 having a lower end 39' and an upper end 39", and preferably includes a second substantially vertical rear post member 41 having a lower end 41' and an upper end 41". The upper end 39" of the first post member 39 is attached to the second end 31" of the first side bar member 31. The upper end 41" of the second rear post member 41 is attached to the second end 33" of the second side bar member 33. The frame means 23 also preferably includes a first side angle member 43 having a first end 43' and a second end 43", and includes a second side angle member 45 having a first end 45' and a second end 45". The first end 43' of the first side angle member 43 is attached to the second end 35" of the third side bar member 35 and the second end 43" of the first side angle member 43 is attached to the lower end 39" of the first rear post member 39. The first end 45' of the second side angle member 45 is attached to the second end 37" of the fourth side bar member 37 and the second end 45" of the second side angle member 45 is attached to the lower end 41' of the second rear post member 41. The frame means 23 also preferably includes a first substantially horizontal rear cross bar member 47 having a first end 47' and a second end 47", and preferably includes a second substantially horizontal rear cross bar member 49 having a first end 49' and a second end 49". The first end 47' of the first rear cross bar member 47 is attached to the upper end 39" of the first rear post member 39 and the second end 47" of the first rear cross bar member 47 is attached to the upper end 41" of the second rear post member 41. The first end 49' of the second rear cross bar member 49 is attached to the lower end 39' of the first rear post member 49 and the second end 49″ of the second rear cross bar member 49 is attached to the lower end 41′ of the second rear post member 41. The frame means 23 may be constructed of any substantially rigid material such as tubular steel, plastic piping or the like, and the various members may be attached to one another in any manner apparent to those skilled in the art such as being welded to one another or by being joined to one another by various coupling members or the like in a manner which will now be apparent to those skilled in the art.

The cover means 19 preferably includes a clear front member 51 for protecting the face of the user of the wheelchair 13. The front member includes an upper edge 51′ for being attached to the front cross bar member 29. Preferably, the front member 51 is pivotally attached to the frame means 23 to allow the user of the wheelchair to pivot the front member 51 up and out of the way when the user sits down or gets up from the wheel chair 13. Hinge member 53 or the like may be provided for allowing the upper edge 51′ of the front member 51 to be pivotally attached to the front cross bar member 29. The cover means 19 preferably includes a top member 55 having a first side edge 55′ and a second side edge 55″. The top member 55 is preferably attached to the first and second side bar members 31, 33. The cover means 19 preferably includes a first side member 57 having an upper edge 57′, and preferably includes a second side member 59 having an upper edge 59′. The upper edge 57′ of the first side member 57 is attached to the first side bar member 31 of the frame means 23. The upper edge 59′ of the second side member 59 is attached to the second side bar member 33 of the frame means 23. The cover means 19 preferably includes a rear member 61 having a first side edge 61′ and a second side edge 61″. The first side edge 61′ of the rear member 61 is preferably attached to the first rear post member 39. The second side edge 61″ of the rear member 61 is preferably attached to the second rear post member 41. The front member 51, top member 55, side members 57, 59, and rear member 61 are preferably constructed of a clear, transparent material so as not to hinder the view of the user of the wheelchair 13. The first and second side members 57, 59 may be provided with sound passageway means 63 to allow sound to pass through the side runner 57, 59. The sound passageway means 63 may be of any typical construction known now apparent to those skilled in the art such as a plurality of apertures shielded in such a manner so as to allow sound to pass through while prohibiting rain or the like from passing therethrough. The first and second side edges 55′, 55″ of the top member 55 are preferably turned downwardly to fit over the first and second side bar members 31, 33 and the upper edges 57′, 59′ of the first and second side members 57, 59. The upper edge 51′ of the front member 51 preferably turns rearwardly and downwardly over the front cross bar member 29. Such a construction will enhance the waterproofness of the cover means 19.

Figure 3:
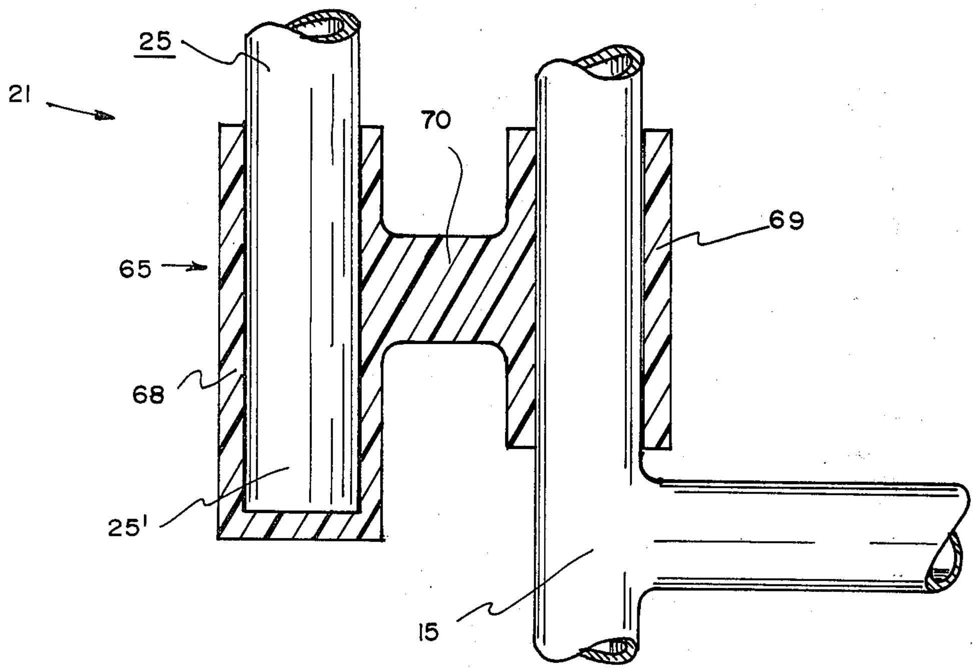
FIG. 3 is a sectional view of a portion of the attachment means of the protector means.
Figure 4:
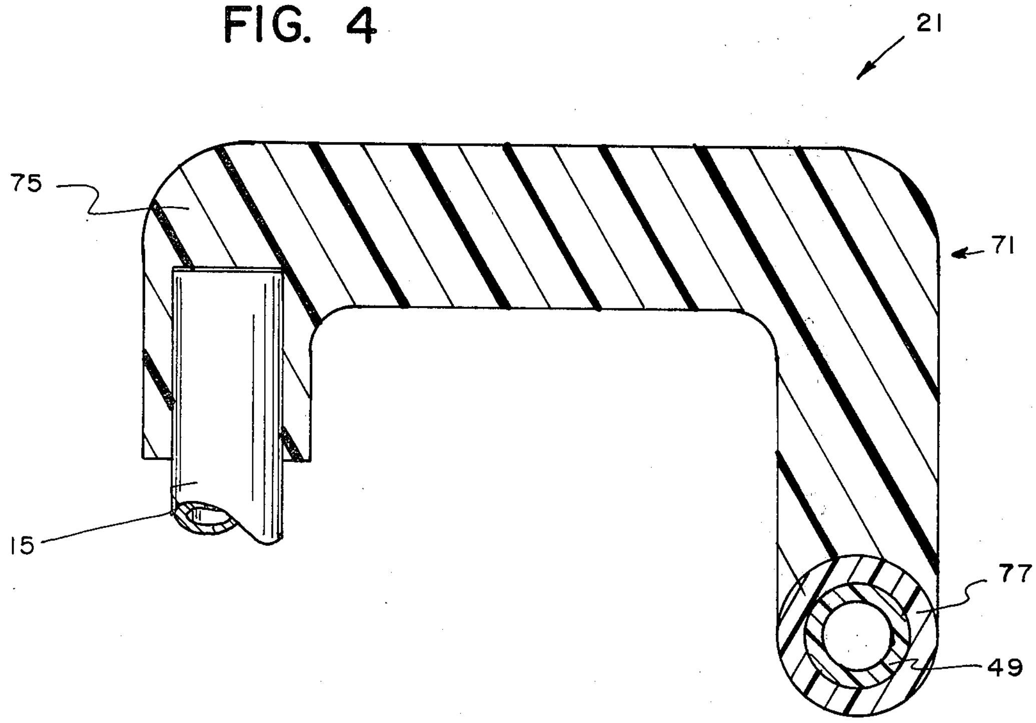
FIG. 4 is a sectional view of another portion of the attachment means of the protector means.

The attachment means 21 preferably includes a first anchor means 65 and a second anchor means 67 for being attached to the front of the wheelchair 13. Preferably, each first and second anchor means 65, 67 is fixedly attached to a portion of the tubular framework 55 at the front of the wheelchair 13 and includes a pocketlike member 68 for slidably receiving the lower end 25′, 27 of the first and second front post member 25, 27 (see, in general, FIG. 3) thereby anchoring the front of the frame means 23 to the wheelchair 13. The pocketlike member 68 may be fixedly attached to the tubular framework 55 in any manner apparent to those skilled in the art. For example, a sleeve member 69 may be positioned around a portion of the tubular framework 55 and welded, glued or otherwise, fixedly attached thereto (see, in general, FIG. 13). The pocketlike member 68 may be fixedly attached to the sleeve member 69 by a bridge member 70 (see, in general, FIG. 3). The attachment means 21 also preferably includes a third anchor means 71 and a fourth anchor means 73 for being secured to the rear of the wheelchair 13. Preferably, each third and fourth anchor means 71, 73 is fixedly attached to the second rear cross bar member 49 and includes a cuplike member 75 for fitting over a portion of the tubular framework 15 at the rear of the wheelchair 13 (see, in general, FIG. 4) thereby anchoring the rear of the frame means 23 to the wheelchair 13. The cuplike member 75 may be fixedly attached to the second rear cross bar member 49 in any manner apparent to those skilled in the art. For example, a sleeve member 77 may be positioned around the second rear cross bar member 49 and welded, glued or otherwise fixedly attached thereto (see, in general, FIG. 4). The cuplike member 75 may be fixedly attached directly to the sleeve member 77 (see, in general, FIG. 4). It should be noted that the attachment means 21 may be adapted to allow the height of the frame means 23 to be varied in any manner now apparent to those skilled in the art.

Various other modifications and additions can be made to the present invention. For example, the hinge members 53 may be used to hingably attach the front cover 51 to the first front post member 25 rather than to the front cross bar member 29 thus allowing the front cover 51 to be opened in a manner similar to a typical door or the like. Additionally, magnetic members (not shown), similar to those used on many cabinet doors, may be used to hold the front cover 51 in the opened and closed position especially which the front cover 51 is hinged to the front post member 51. Further, protector members 77 may be attached to the bottom edges of the first and second side members 57, 59 to protect the arms and lower body of the user of the wheelchair 13 (see FIG. 1). The protector members 77 may be attached to the side members 57, 59 in any manner apparent to those skilled in the art such as by hook members 79 which removably fit into apertures 81 in the bottom edge of the first and second side members 57, 59 (see FIG. 1).

Although the present invention has been described and illustrated with respect to a preferred embodiment thereof, it is not to be so limited since changes and modifications can be made therein which are within the full intended scope of the invention.

I claim:

1. The combination with a wheelchair of a protector means for protecting the user of a wheelchair, said protector means comprising:

(a) cover means for covering at least a portion of the user of the wheelchair, said cover means including a clear front member for protecting the face of the user of the wheelchair, said front member having an upper edge;

(b) attachment means for attaching said cover means to the wheelchair, said attachment means including first and second anchor means for being secured to the front of the wheelchair; and (c) frame means for supporting said cover means on the wheelchair, said frame means including first and second substantially vertical front post members, each of said first and second front post members having a lower end and an upper end, said lower end of said first front post member being removably attached to said first anchor means, said lower end of said second front post member being removably attached to said second anchor means, said frame means including a substantially horizontal front cross bar member, said front cross bar member having first and second ends, said first end of said front cross bar member being attached to said upper end of said first front post member, said second end of said front cross bar member being attached to said upper end of said second front post member, said upper edge of said front member of said cover means being pivotally attached to said front cross bar member.

2. The combination of claim 1 in which said frame means includes first and second substantially horizontal side bar members, each of said first and second side bar members having first and second ends, said first end of said first side bar member being attached to said upper end of said first front post member, said first end of said second side bar member being attached to said upper end of said second front post member; in which said frame means includes first and second substantially vertical rear post members, each of said first and second rear post members having a lower end and any upper end, said upper end of said first rear post member being attached to said second end of said first side bar member, said upper end of said second rear post member being attached to said second end of said second side bar member; and in which said attachment means includes pivot means for pivotally attaching said lower ends of said first and second rear post members to the rear of the wheelchair.

3. The combination of claim 2 in which said cover means includes a top member for being attached to said first and second side bar members, a first side member for being attached to said first side bar member, and a second side member for being attached to said second side bar member.

4. The combination of claim 3 in which said frame means includes a substantially horizontal first rear cross bar member having a first end and a second end, said first end of said first rear cross bar member being attached to said upper end of said first rear post member, said second end of said first rear cross bar member being attached to said upper end of said second rear post member; and in which said cover means includes a rear member for being attached to said first and second rear post members.

5. The combination of claim 4 in which said frame means includes substantially horizontal third and fourth side bar members, each of said third and fourth side bar members having first and second ends, said first end of said third side bar member being attached to said first front post member between said upper and lower ends thereof, said first end of said fourth side bar member being attached to said second front post member between said upper and lower ends thereof; in which said frame means includes first and second side angle members, each of said first and second side angle members having first and second ends, said first end of said first side angle member being attached to said second end of said third side bar member, said second end of said first side angle member being attached to said lower end of said first rear post member, said first end of said second side angle member being attached to said second end of fourth side bar member, said second end of said second side angle member being attached to said lower end of said second rear post member; and in which said frame means includes a substantially horizontal second rear cross bar member having a first end for being attached to said lower end of said first rear post member and having a second end for being attached to said lower end of said second rear post member.

6. The combination of claim 5 in which said attachment means includes third and fourth anchor means for being secured to the rear of the wheelchair and for being secured to said second rear cross bar member.

7. The combination of claim 6 in which said top member, said first and second side members, and said rear member are clear.

8. The combination of claim 7 in which said first and second side members have upper edges and said top member has first and second side edges, said first and second side edges of said top member being turned downwardly to fit over said first and second side bar members and said upper edges of said first and second side members; and in which said upper edge of said front members turns rearwardly and downwardly over said front cross bar member.

9. The combination of claim 8 in which is included protector means for being attached to the bottom edges of said first and second side members and for protecting the arms and lower body of the user of the wheelchair.

* * * * *